Sept. 16, 1930.  G. LEHBERGER  1,775,861
FLYING MACHINE
Filed May 28, 1929  4 Sheets-Sheet 1

George Lehberger
INVENTOR
BY
ATTORNEY

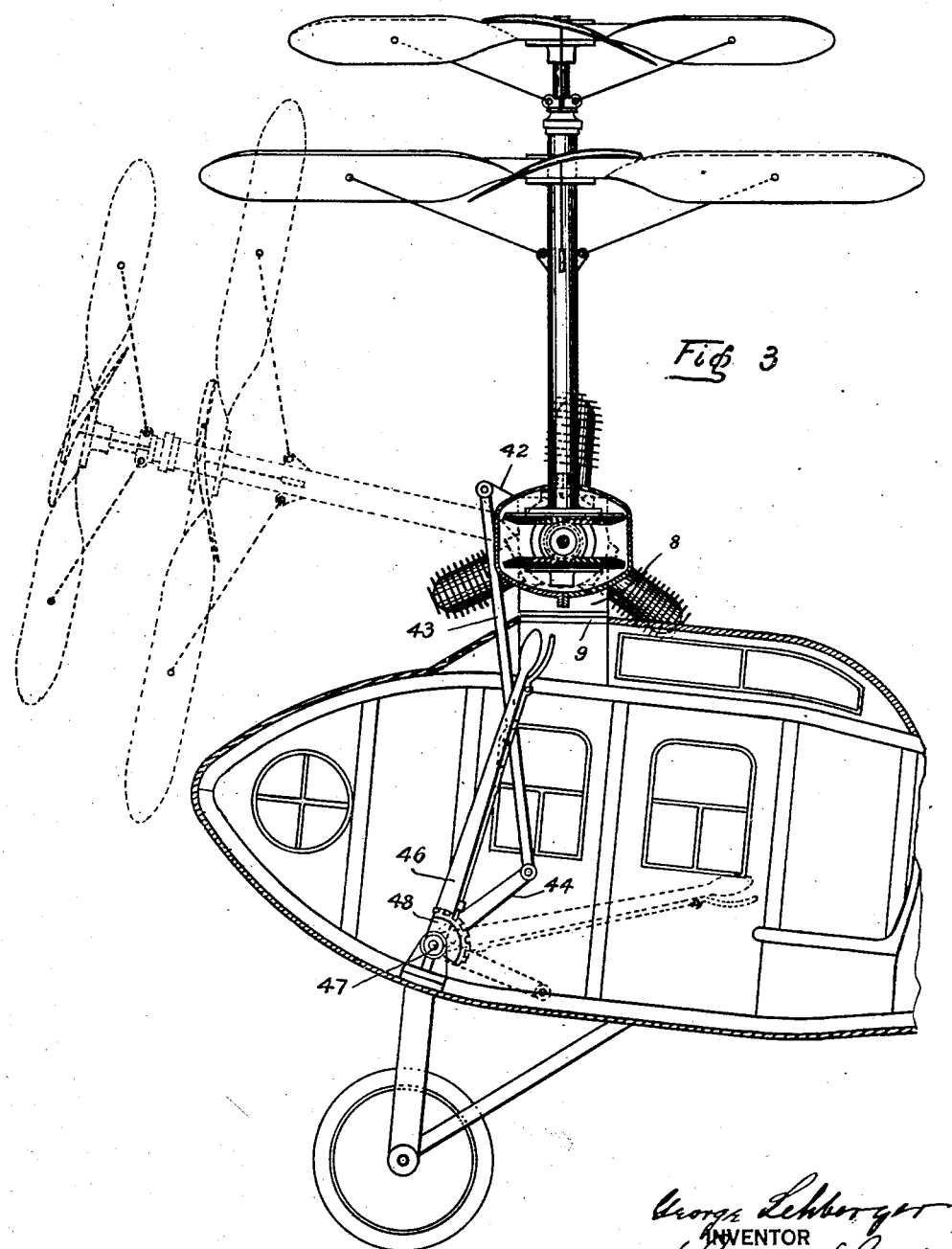

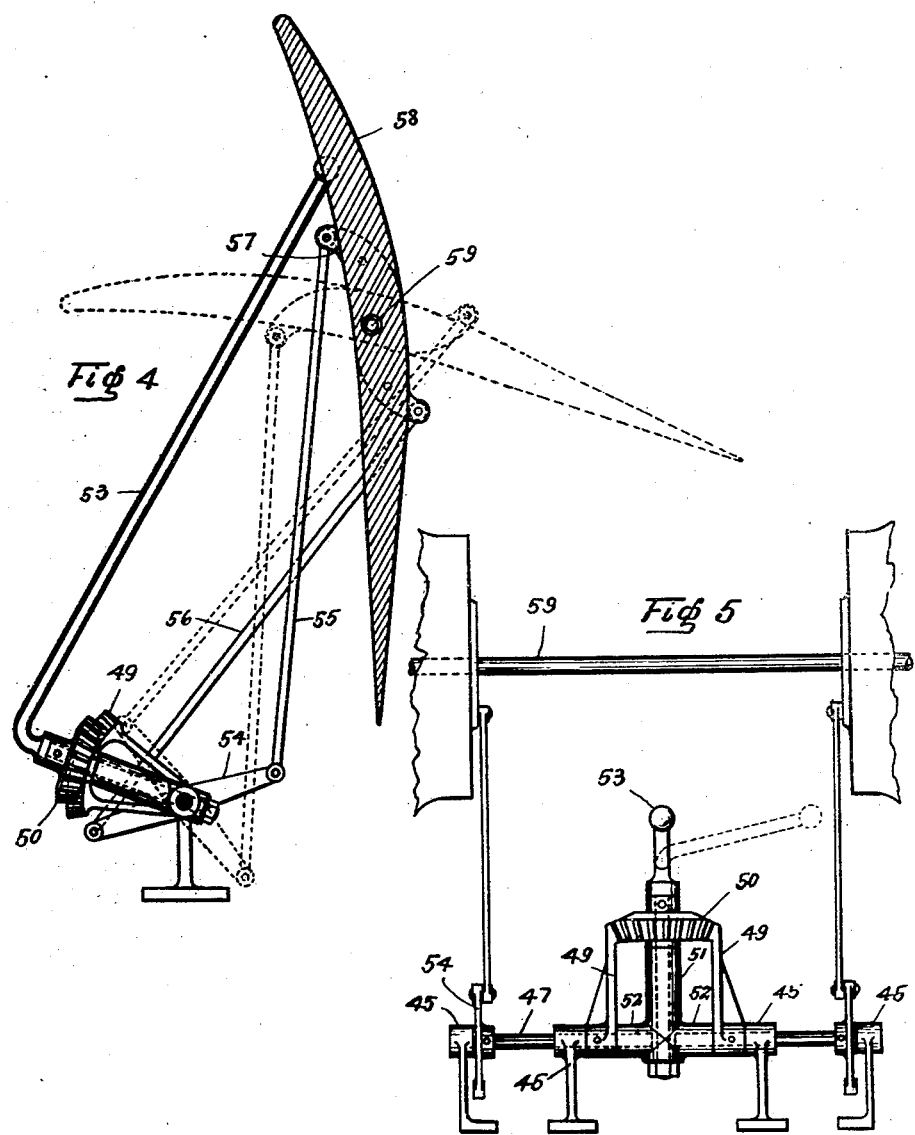

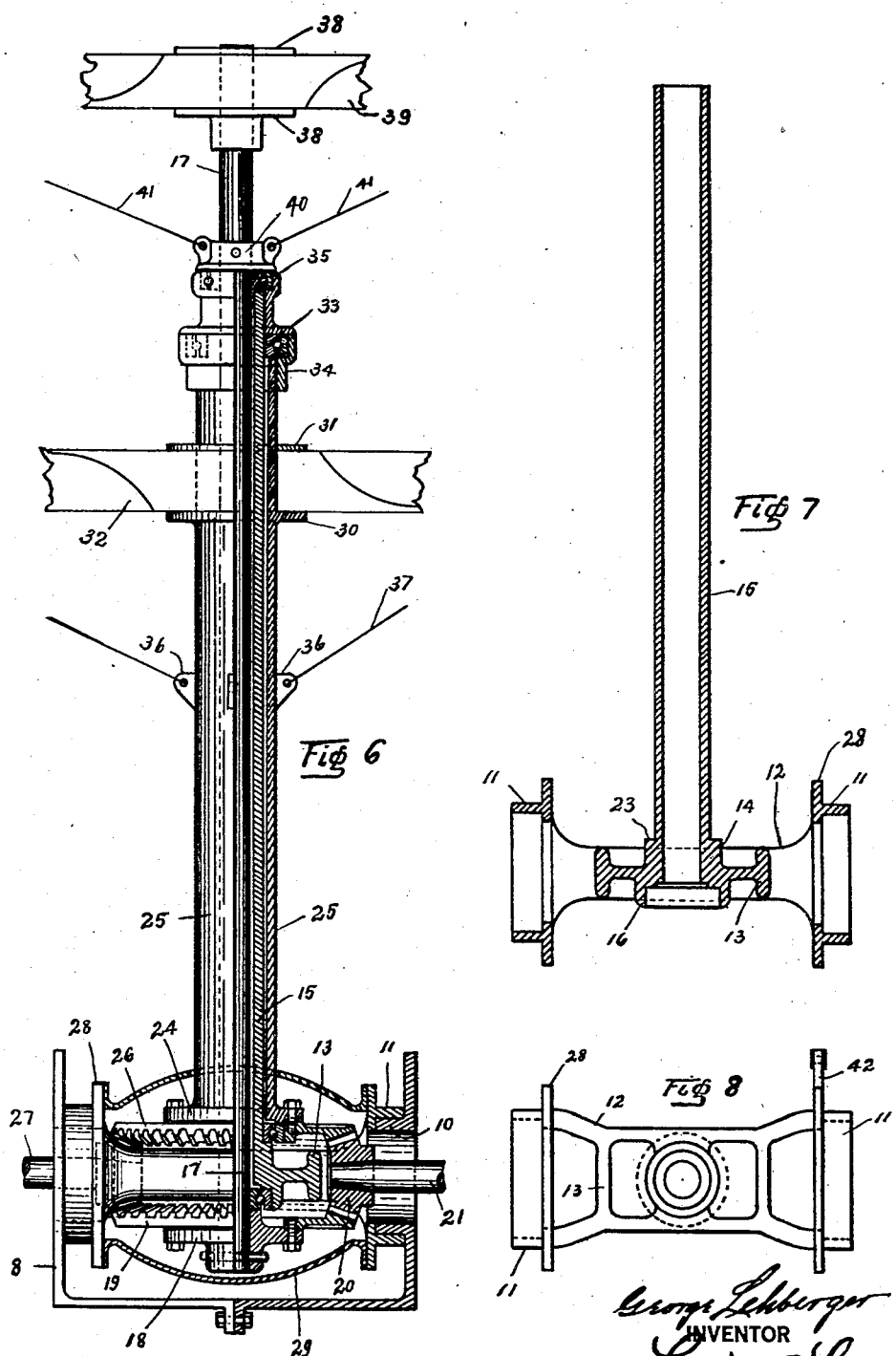

Patented Sept. 16, 1930

1,775,861

UNITED STATES PATENT OFFICE

GEORGE LEHBERGER, OF UNION TOWNSHIP, HUDSON COUNTY, NEW JERSEY

FLYING MACHINE

Application filed May 28, 1929. Serial No. 366,607.

This invention relates to heavier-than-air flying machines and more particularly to devices to enable such machines to ascend and descend vertically.

Widespread use of the airplanes has heretofore been restricted to a large extent mainly because of the fact that considerable space is required to rise and land such machines. Suitable landing fields are generally not conveniently located sufficiently near the business centers of large cities and the time saved by the use of the airplane is used in travelling from the landing field to the center of business activities. Obviously, this objection would be removed where such air machines are provided with means to enable their vertical ascent and descent.

It is an object of this invention to provide an arrangement of propellers which may be adjusted to various angular position to enable an airplane to be raised vertically or driven forwardly as may be desired.

A further object is the provision of means of varying the angles of the wings of an airplane so that the manipulation of the airplane will be facilitated under various circumstances.

These and other advantages, which will later appear, are accomplished by the simple and practical construction and arrangement of parts hereinafter described and exhibited in the accompanying drawings, forming part hereof, and in which:

Figure 3 represents an enlarged elevational view similar to that shown in Figure 1.

Figure 4 represents an enlarged side view of mechanism for controlling the angle of inclination of the wings of an airplane.

Figure 5 represents a front view of the structure shown in Figure 4.

Figure 6 represents a sectional plan view showing details of the propeller driving mechanism employed in my device.

Figure 7 represents a sectional view of a detail of the mechanism shown in Figure 6.

Figure 8 represents an end view of the structure shown in Figure 7.

Figure 1:
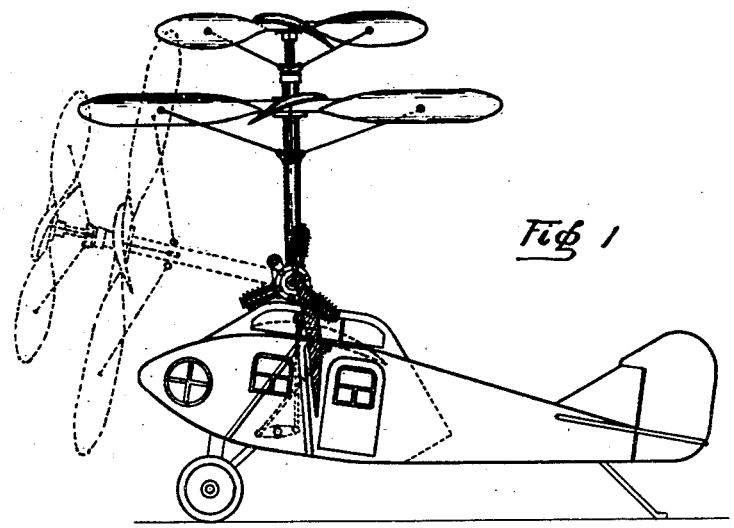
Figure 1 represents an elevational view of an airplane equipped with my device.

Referring to the drawings, a bracket 8 is fixed to the frame 9 of the forward portion of the body of an airplane. The sides of the bracket 8 have inwardly protruding cylindrical portions 10, which serve as bearings for the drums 11, integral with the side members 12 of a propeller shaft supporting member. (See Figures 6 and 7.) The side members 12 are connected by webs 13, which are integrally formed with a collar 14, at the lower extremity of a tube 15. The collar 14 is provided with a recess 16 in which is disposed a lateral and thrust bearing for the shaft 17 and the plate 18, the latter being secured to the lower extremity of shaft 17 by means of a pin.

Figure 2:
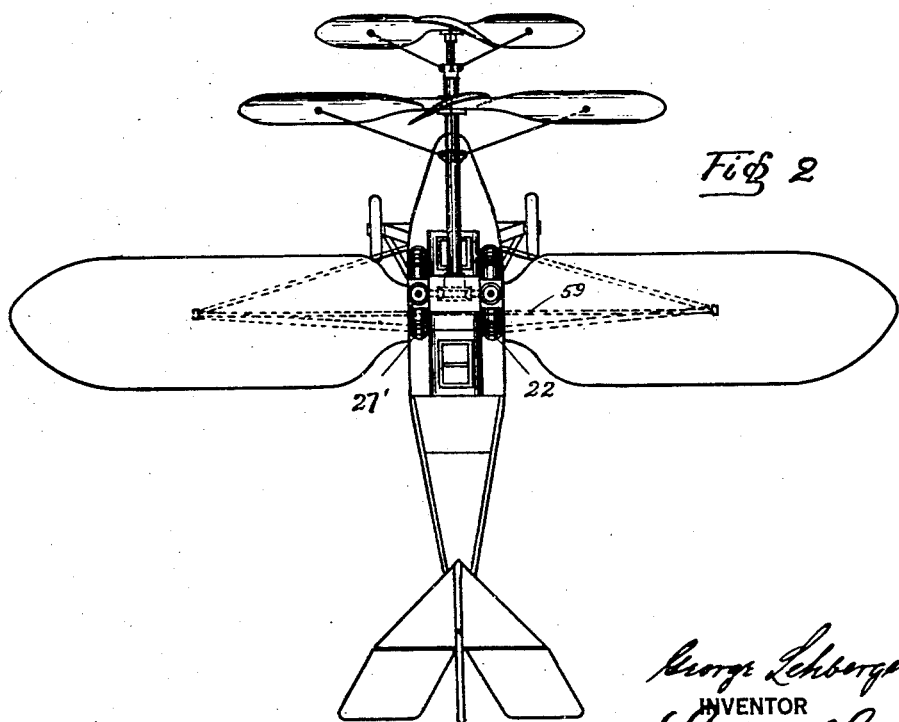
Figure 2 represents a plan view of the structure called for in Figure 1.

Attached to the plate 18 is a bevel gear 19 in mesh with bevel pinion 20 fixed to shaft 21, the latter being driven by an engine 22, supported alongside of the bracket 8 as shown in Figures 1 and 2.

The collar 14 is provided with shoulders 23 which opposed shoulders on plate 24 to support a lateral and thrust bearing for the hollow propeller shaft 25, which encompasses the tube 15, the plate 24 being integral with shaft 25 and having attached thereto a bevel gear 26 meshing with bevel pinion 20 and with a similar bevel pinion attached to shaft 27 on the opposite side. The bevel pinion attached to shaft 27 also meshes with bevel gear 19, and shaft 27 is driven by an engine 27' positioned alongside of bracket 8 and similar to engine 22.

The drums 11 are provided with flanges 28 to which are attached a casing 29, the latter housing the gearing and associated structure as above described and shown in Figure 6.

Hollow shaft 25 is provided with spaced flanges 30 and 31 between which are positioned a propeller 32, and the upper end of the shaft 25 engages a thrust bearing 33 enclosed in a cap 34, the latter being recessed at its upper end to support a bearing 35 for the shaft 17 which is positioned within tube 15.

Integral with shaft 25 are four ears 36 to which are attached tension wires 37, the other ends of the wires being connected to the four blades of the propeller 32.

The upper end of shaft 17 has fixed thereto a flanged collar 38, which cooperates with a spaced plate 38' to hold the propeller 39 fixed to the shaft 17. A collar 40 is secured to shaft 17 and engages bearing 35, the collar being provided with four ears similar to ears 36, to which are attached tension wires 41, which are also connected with the four blades of propeller 39.

Fixed to flange 28 is an arm 42, which has pivotally connected thereto a link 43, which in turn is pivotally connected to an arm 44 integral with a lever 46 loosely mounted on a shaft 47, the latter being journalled in bearings 45 supported by the frame of the body of the airplane. A rack 48 is stationarily mounted on one of the bearings 45, and the lever 46 is provided with a spring pressed detent adapted to engage the teeth of the rack for the purpose of holding the lever in various positions of adjustment.

A foot brake with the brake band applied around the drum lever, Figure 6, may be used instead of rack 48, Figure 3.

Fixed to shaft 47 are a pair of segmental bevel gears 49 engaging opposite sides of a bevel pinion 50 attached to a shaft journalled in a hollow post 51, the latter having hollow right angular projections 52 in which the inner ends of shaft 47 are journalled and supported, the shaft 47 being formed in two parts as shown in Figure 5. A handle 53 is provided for rotating the bevel pinion 50 to cause the gears 49 to rotate both sections of shaft 47.

Fixed to the extremities of the sections of shaft 47 are arms 54 to the ends of which are pivotally connected the links 55 and 56, which in turn are pivotally connected to ends of arms 57, the latter being attached to the wings 58 of the airplane.

The wings 58 are pivotally mounted on a shaft 59, and rotation of the bevel pinion 50 will cause the wings to rotate about shaft 59 and be inclined at any desired angle.

A hollow shaft 59, Figures 2 and 4, embodied in both side planes and positioned on top of the fuselage in suitable brackets (not shown) from which said planes will be operated assures a strong and safe construction. The control levers for said planes are of double construction as a safety factor.

The lever 53, Figure 4, is for the control of the side wings only, a movement upwardly and forwardly with the lever turns the wings into a vertical position as shown in Figure 4; and moving the lever backward and downward turns the plane into a horizontal position as shown by the dotted lines.

With the lever and planes in that position the angle of incidence may be changed to any desired angle by moving the lever slightly up or down. By moving the lever to the right or to the left the planes will then assume the function of the ailerons on the present flying machine.

In operation, when it is desired that the flying machine ascend vertically, the lever 53 is swung forwardly (see Figure 4) to place the wings 58 in a vertical plane, as shown in Figure 4. The lever 46 is moved forwardly to swing the propeller shafts to a vertical position as shown in Figure 3, and when the engines 22 and 27' are operated, the effect of the horizontally positioned rotating propellers will be to raise the machine vertically. The wings, being in a vertical plane, will offer no resistance to the rise of the machine.

When the machine has risen to a sufficient height, the lever 53 is swung backwards to place the wings in a horizontal plane, and the lever 46 is then pulled back to the position shown in dotted lines in Figure 3, which action throws the propeller shafts and propellers into a substantially horizontal position as shown in Figure 3 in dotted lines. It will be noted that the propeller shafts are inclined slightly above the horizontal which enable the slightly inclined propellers to exert a lifting force sufficient to support the weight of the propeller shafts.

The casing 29 is preferably filled with oil in order to provide proper lubrication of the gearing therein. From the above description it will be seen that I have provided a simple and readily adaptable device for enabling the vertical ascent and descent of airplanes. Also, the provision of means for varying at will the inclination of the wings which enables the rise or descent of the machine while flying forwardly in the air without the necessity of resorting to the usual ailerons.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent is:

1. In a flying machine having a frame, a bracket mounted on said frame, a tube having right angular projections rotatably mounted on the bracket, a shaft journalled in the tube, a tubular shaft journalled on the tube, propellers mounted on said shafts, means for driving said shafts, and means for rotating the tubular member whereby the shafts may be adjusted to a vertical or to a substantially horizontal position.

2. In a flying machine having a frame, a bracket mounted on said frame, a tube having lateral projections rotatably mounted on the bracket, a tubular shaft journalled on the tube, means for driving said shaft, a propeller mounted on the shaft, and means for rotating the tubular member to adjust the position of the shaft.

3. In a flying machine having a frame, a bracket mounted on the frame, a tubular member having lateral projections, cylindrical flanges on said projections, coinciding cylindrical flanges on the bracket to rotatably support the projections, a tubular shaft journalled on the tubular member, a shaft journalled in the tubular member, means for driving said shafts, and means for rotating the tubular member on the bracket.

This specification signed this twenty-seventh day of May, 1929.

GEORGE LEHBERGER.